United States Patent [19]
Duval

[11] 3,832,724
[45] Aug. 27, 1974

[54] VIDEO PHOTO RECORDING DEVICE FOR THE INSPECTION OF THE INTERIOR OF PIPES

[75] Inventor: Mark Duval, St-Bruno De Montarville, Quebec, Canada

[73] Assignee: Sanitank Inc., Montreal, Canada

[22] Filed: May 18, 1973

[21] Appl. No.: 361,659

[52] U.S. Cl. .................................. 354/63, 354/219
[51] Int. Cl. .......................................... G03b 17/08
[58] Field of Search ............... 95/11 HC, 44; 354/63

[56] References Cited
UNITED STATES PATENTS
2,849,530  8/1958  Fleet ................................. 95/11 X
2,883,903  4/1959  Robinson ............................. 95/44
3,621,767  11/1971  Hyzer .................................. 95/11

Primary Examiner—John M. Horan

[57] ABSTRACT

This invention relates to an inspecting device specially adapted for detecting and locating defects or the like in the interior of a pipe. The device comprises a video camera and a film camera enclosed in a watertight housing which also carries lamps at the front end thereof for adequately illuminating the interior of the pipe. The device is pulled through the pipe by winches and as inspection progresses the interior thereof is continuously observed at a remote location on a TV monitor associated with the video camera and each time a defect or the like is noted a picture is taken by the film camera.

6 Claims, 8 Drawing Figures

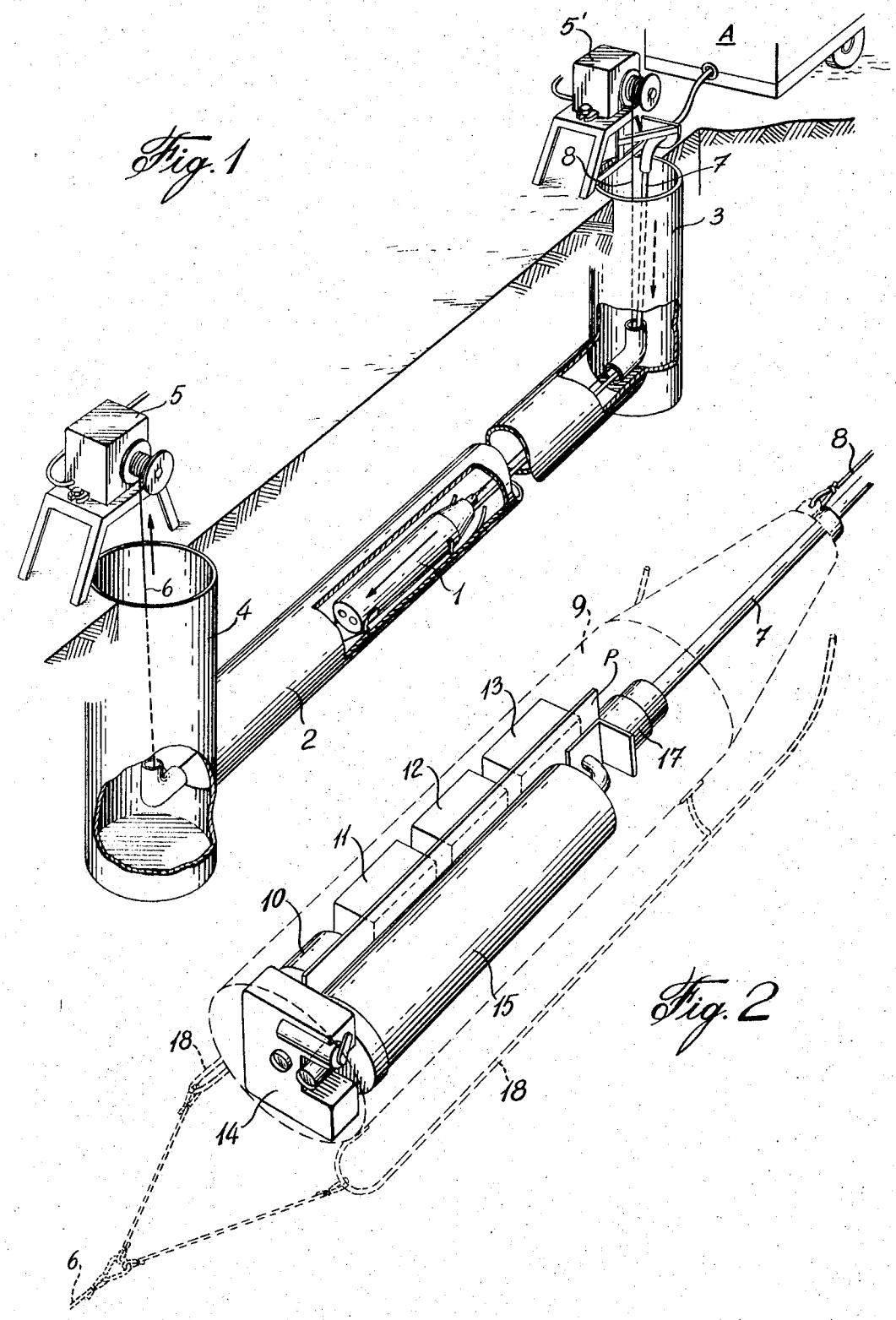

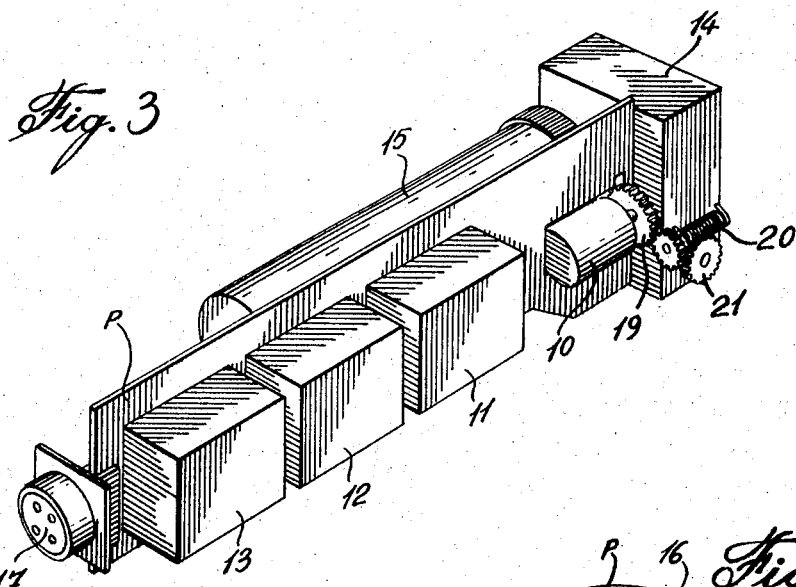
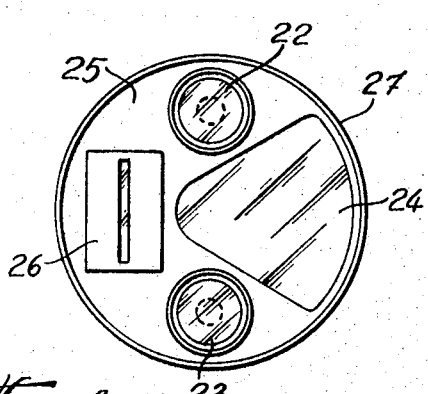
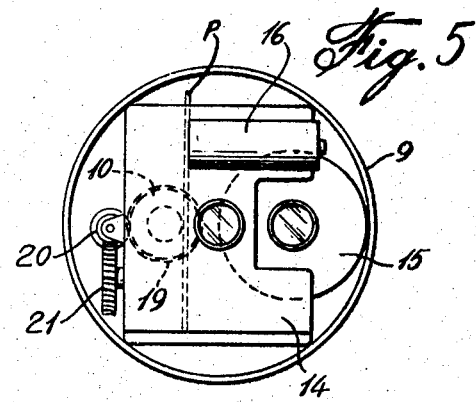
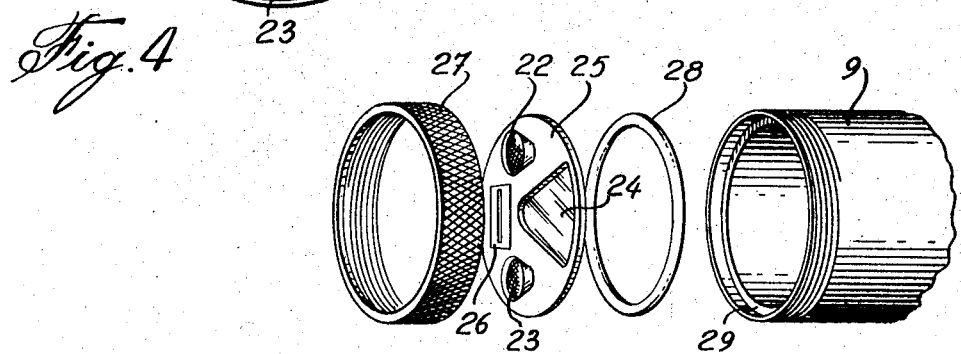

VIDEO PHOTO RECORDING DEVICE FOR THE INSPECTION OF THE INTERIOR OF PIPES

The present invention relates generally to methods and apparatus for detecting and measuring the location of defects and the like in pipelines such as sewer lines by photographically inspecting the interior of the pipes, usually located underground.

More specifically the method or process and the apparatus in accordance with the present invention relate to the inspection of sewer pipes.

The inspection of drains, sewer and the like buried pipes for the determination and location of cracks, misalignments, obstructions, off-grade portions, etc., has always presented a vexatious and challenging problem. Nevertheless, the pipelines either following installation or after a certain number of years have to be carefully examined in order to find out whether they have been properly installed or, as time goes on, they do not deteriorate unduly to the point of structural collapse. In this respect, sewer pipes need special inspection care in view of the tremendous investments made each year by municipalities or any administrative organizations to develop, install and repair such sewer pipe networks.

Inspection of sewers either following installation or after a number of years in service presents a particular problem, besides the fact that these conduits are located underground, that accessibility to them is rendered much difficult due to large intervals (varying usually between 200 and 400 feet) at which manholes are settled.

Number of techniques such as infiltration measurements, use of weirs, etc., air and smoke tests, bottle gauges, rainfall similation tests have been developed to determine the conditions of sewers.

However, the above-mentioned techniques only permit a rough evaluation of the conditions of a sewer to a limited extent since they do not reveal the existence of protruding laterals, roots, misaligned joints, etc., nor the exact location of the same.

Accordingly, more reliable techniques which allow a direct visual inspection of the interior of a sewer pipe have been developped. These techniques imply the use of either a photographic recording device, viz film camera, or a closed circuit television camera together with a monitor.

The former technique consists in the use of a photographic recording device such as a 8, 16 or 35 mm film camera installed in a watertight cylindrical housing. Such a technique is taught, for instance, in U.S. Pat. Nos. 2,933,024 (Apr. 29, 1960) to Baggs et al., 3,244,085 (Apr. 5, 1966) to Pulfer, 3,777,934 (Apr. 16, 1968) to Crichkon et al., 3,557,674 (Jan. 26, 1971) to Carney and 3,621,767 (Nov. 23, 1971) to Hyzer et al. In all these references, there is depicted a photographic or a movie camera for inspecting the interior of a pipe. The camera is enclosed in a housing and the allied components contained therein are connected by cable to a system control unit located at ground level. The cable usually consists of leads for controlling the components inside the housing and power leads for energizing these components. Either a flash strobe or a constant light source is provided for illuminating the interior of the sewer pipe. Photographs are taken inside the sewer at regular intervals of length in order to get a pictoral record of a section of the pipe being inspected.

A second technique consists in the use of a closed circuit television system. As described and illustrated in, for instance, U.S. Pat. Nos. 2,971,259 (Feb. 14, 1961) to Hahnau et al. and 2,849,530 (Aug. 26, 1958) to Fleet, a video camera is installed in a watertight cylindrical housing and completed by a constant light source. The housing and the components contained therein are connected by cable to a system control unit and a monitor above ground. The cable usually consists of a coaxial cable, leads for controlling the components inside the housing and power leads for energizing these components, so that as the video camera is pulled through the sewer pipe, the subject is continuously observed on the monitor.

The advantages of the first above-described system, that is the one using a film camera, are that clear and easily interpretable photographs are obtained. The disadvantages are that what is being photographically recorded cannot be observed at the same moment as the inspecting device is pulled through the pipe, thus not providing intimate and immediate knowledge of the subject. In addition, water and sewage cannot be observed in motion nor may the progress of the camera housing be stopped for a thorough and lengthy observation.

On the other hand, the second above-described system is particularly advantageous because of immediacy of observation, the ability to detect movement of waters and changes in the flow, the possibility of stopping the probe for a thorough and lengthy observation. However, this system presents some drawbacks in that the pictoral record is in fact a photographic reproduction of an electronic reproduction of the subject and, therefore, the clarity of the photograph is diminished.

Consequently, the advantages of one system are the disadvantages of the other.

It is a prime object of the instant invention to provide a system for inspecting the interior of pipes which is absolutely reliable by effectively combining the advantages of prior art systems, but obviating the intrinsic drawbacks of the same. This is achieved by combining a closed circuit television system and a film camera, both enclosed in a common housing which can be pulled through sewer pipes the diameters of which are as small as 8 inches.

In its preferred form, the closed circuit TV camera is set in such a way that the view seen on the television monitor which is connected by cable to the video camera is the identical image presented to the film through a 35 mm camera lense.

A feature of the device in accordance with the invention resides in that whenever a specific subject is observed on the television monitor a film picture may be taken at the precise location of such subject at the very moment the latter is observed and exactly as seen on the television monitor. This unique feature is the ability to view a scene through a closed circuit television camera and by means of a remotely controlled film camera record the actual scene on film rather than record a projected vision of the same.

Further objects and advantages of the invention will be apparent as the specification progresses and the new and useful features of the inspecting device will be more fully defined in the claims attached hereto.

The preferred forms of the invention are illustrated in the accompanying drawings forming a part of this description, in which:

FIG. 1 depicts a perspective view showing a preferred form of the inspecting device constructed according to this invention as it appears in use in a typical sewer system;

FIG. 2 is a perspective view of the inspecting device in accordance with the invention;

FIG. 3 is a skeleton view of the inspecting device of FIG. 2;

FIG. 4 is an elevation view of the front end of the inspecting device;

FIG. 5 is an elevation view of the camera arrangement inside the housing;

FIG. 6 shows an exploded view of the front end assembly of the housing;

Figure 7:
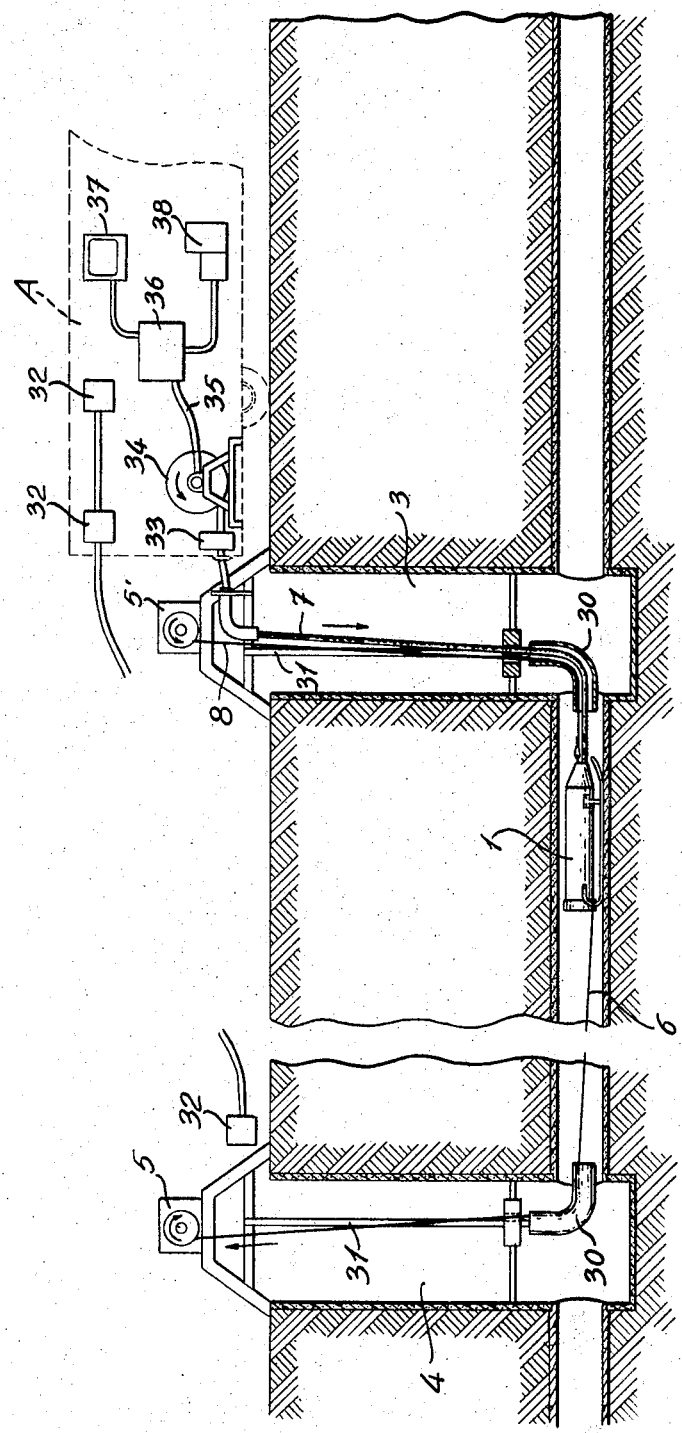
FIG. 7 is a partially cross-sectional view of the system showing the inspecting apparatus in operation together with the electronic components.

As shown in FIG. 1, an inspecting device 1 constructed in accordance with the invention is set into inspecting position inside a sewer pipe 2 between two manholes 3 and 4. The device 1 is introduced into the sewer pipe through a manhole 3 and is pulled towards another manhole 4 by means of winch 5 through cable 6 attached to the front end of the inspecting device 1. A winch 5¹ is also provided close to the first manhole 3 to allow by means of cable 8 the stopping, the stabilization or a backward motion of the inspecting device 1 so that a clear picture of the desired location may be taken or reinspection of suspect areas of the pipe may be achieved.

Electric power is supplied to and informations are retrieved from the inspecting device through electric cable 7, one end thereof being connected to the back part of the inspecting device and the other end to a control system, described hereinafter, which is enclosed in a vehicle A.

The inspecting device will now be described with reference to FIGS. 2 to 6 wherein like reference numbers refer to like components. The inspecting device 1 comprises a housing 9 made up of, preferably, stainless steel shell, approximately cylindrical and of about 5 inches in diameter and 26 inches in length. The housing encloses a television camera 15 and a 35 mm film camera 14. Associated with the film camera, there is provided a miniature motor 10 adapted to advance the film thereof, a flash unit 11 for the strobe tube 26 (FIG. 4), a solenoid drive 16 used for tripping the shutter of the film camera. Also mounted inside the shell, there are two transformers 12 and 13 which supply lamps 22 and 23 (FIG. 4) with high current and low voltage.

All the above-mentioned elements are mounted into place inside the shell on a base plate P.

To positively prevent stoppage at pipe joints or the like, the shell 9 is provided with skids 18 which are specially formed so as to provide a relatively low friction sliding movement of the inspecting device through the pipe. The steel cable 6 is attached to the skids 18 for pulling the camera through while the trail rope 8 allows a positive axial movement of the device.

To the front end of the housing 9, there is held an aluminum face plate 25 (FIG. 4) with a viewing port 24, preferably made of Pyrex glass for both television and film camera lenses, two quartz lamps 22 and 23 providing a constant light source for television viewing and an electronic flashtube 26 connected to the film camera providing the necessary light as pictures are taken. The face plate 25 is secured, as better seen in FIG. 6, to housing 9 by means of a precision-threaded brass ring 27 forcing a rubber gasket 28 between the face plate and shoulder 29 formed in the housing to provide a watertight seal.

The back part of the housing is tapered and through which a waterproof cable 7 (FIG. 2) is sealingly extended and connected to a pin type plug 17 of the free end of the video and power cable.

FIGS. 3 and 5, in particular, show how the film of camera 14 is advanced by means of a miniature motor 10 through gear 19 rotating the worm gear 20 and the winding gear 21. The advance of the camera film may also be done automatically after each picture is taken.

With reference to the FIGS. 7 and 8, a description will now be given of the general operation of the system in accordance with the invention. The steel pulling cable 6 is pulled back through the sewer from the further winch location. This steel cable is then attached to the skids 18 at the front of the camera housing. A second steel cable 8 is also attached to the back end of the camera housing. Then, once the winches 5 and 5¹, elbows 30 and supports 31 have been properly placed, the camera housing is introduced into the sewer pipe with the video and power cable 7.

The video and power cable 7 connects the components in the camera housing to the system control unit 36 and to the monitor 37. This cable is wound on a cable reel 34 from which a cable 35 runs to the system control unit. A continuous contact at the reel 34 is assured to cable 35 through a slip ring arrangement. Telecommunications and control elements 32 extend between the remote vehicle A and the advancing winch means 5.

Once the camera housing has been properly aligned in the sewer pipe and the whole system energized by means of generator 38 or other power source supplying 115 VAC, the inspection work can begin.

As the camera housing is pulled forward in the sewer pipe with the light source 22, 23 illuminating the interior of the pipe, the scene is reproduced on the monitor 37. When a subject of interest is observed on the monitor the camera housing is stopped and footage is read from a footage counter 33 with a back-up reading from markings on the video and power cable 7.

The two quartz lamps illuminating the interior of the sewer are dimmed individually by rheostat switches R1 and R2 through switches S2 and S6, respectively. A photograph is taken with the 35 mm camera by tripping a switch button S5 in the system control unit 36. This tripping energizes a solenoid switch which in turn trips the shutter of the film camera. At the same time, the strobe light flashes, triggered by an interval mechanism shutter in the camera.

By pressing switch S5 to take a picture, an electric pulse is propelled to a transistor switch S which in turn activates the solenoid drive and a motor M. This motor timer delays and times the motor drive which advances the film and makes ready for the next picture.

Figure 8:
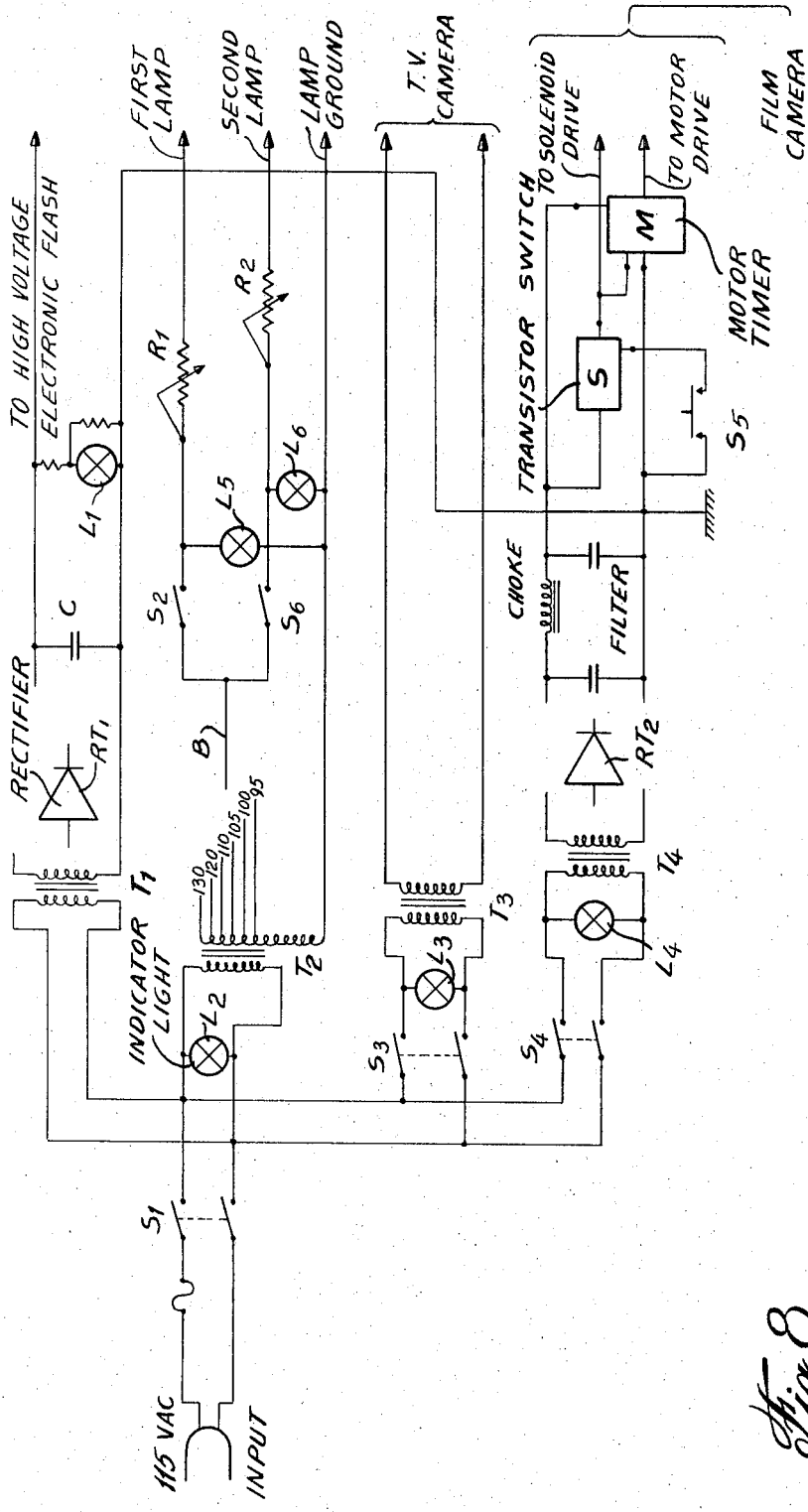
FIG. 8 is a circuit diagram for carrying out the inspecting process in accordance with the invention.

From the control unit 36, electrical energy is sent to the various elements composing the inspecting device, as shown in the circuit diagram of FIG. 8. Consequently, the electronic flash is supplied with high voltage upon actuation of the "on-off" switch S1 through a transformer T1, rectifier RT1 and capacitor C. The indicator light L1 gives a "on" signal each time the capacitor C has a sufficient voltage charge to illuminate the electronic flash tube.

The two quartz lamps 22 and 23 (FIG. 6) are each independently illuminated under controlled luminosity owing to their respective "on-off" switches S2 and S6 in series with their respective rheostat dimmers R1 and R2, the indicator lights L5 and L6 showing which one being activated. The voltage level applied to each lamp is further controlled by connecting terminal B to one of the terminal outputs 95 to 130 at the secondary of transformer T2. The TV camera is energized by opening the "on-off" switch S3 through transformer T3 which acts as a voltage regulator.

By pressing the push-button switch S5, the transistor switch S is activated which energizes the solenoid drive and the motor timer M, the signal being previously filtered and rectified by rectifier RT2 as supplied by transformer T4 upon actuation of the "on-off" switch S4.

The control unit 36 (FIG. 7) may also include a counter (not shown) for indicating the number of pictures already taken by the film camera. AC and DC voltmeters may also be set at the various points of the circuit to control the variations of voltage at the same.

Modifications may be made in the invention as herein particularly described without departure from the scope of the invention. Accordingly, the foregoing description is to be construed as illustrative only and is not to be construed as a limitation upon the invention as defined in the claims which follow.

I claim:

1. A pipe interior pictorial inspection and recording system comprising, in combination,
   a. a closed-circuit video camera;
   b. a film camera having a remotely controllable shutter;
   c. an illumination system for the interior of said pipe, said illumination system including photographic lighting means operable in synchronism with said film camera shutter, and at least one additional lamp means;
   d. means for supporting said cameras and illuminating system within a pipe to be inspected, said cameras and illuminating system having viewing and projecting means aimed toward the same interior portion of pipe to be inspected;
   e. means for progressively and controllably advancing said supporting means through the interior of a pipe to be inspected;
   f. control means remote from said supporting means and in communication with said cameras, illumination system and supporting means, said control means including means for selectively controlling the advancement of said supporting means advancing means, including stopping said advancing means, means for controlling the illumination of said additional lamp means, and means for controlling actuation of said film camera shutter while said supporting means is advancing through said pipe, including when said advancing means is stopped in said pipe;
   g. a remote video monitor screen in communication with said video camera;
   h. means for indicating the degree of advancement of said supporting means through said pipe; and
   i. remote power supply means and means for connecting said power supply to said cameras, illumination system and supporting means advancing means.

2. A pipe interior pictorial inspection and recording system as recited in claim 1 wherein said film camera is a still picture camera having a motorized film advancing means, and said photographic lighting means is a capacitative discharge strobe type; and further including a remote means for indicating the readiness of said capacitative discharge strobe lighting means, and a remote film exposure counter.

3. A pipe interior pictorial inspection and recording system as recited in claim 1, further wherein said supporting means includes a protective enclosure housing for said cameras, said housing having a removable face plate, said face plate having at least one viewing port covered with transparent material located in front of the respective lens elements of said video and film cameras.

4. A pipe interior pictorial inspection and recording system as recited in claim 3, further wherein said forwardly facing face plate supports said photographic lighting means and said additional lamp means.

5. A pipe interior pictorial inspection and recording system as recited in claim 1, further wherein said means for controlling said additional lamp means is a dimmer switch.

6. A pipe interior pictorial inspection and recording system as recited in claim 1, wherein said additional lamp means comprises two quartz lamp elements, each lamp element being individually controllable by a dimmer switch.

* * * * *